United States Patent [19]

Mitchell et al.

[11] Patent Number: 5,413,256
[45] Date of Patent: May 9, 1995

[54] VALVE ROTOR

[75] Inventors: Andrew Mitchell, Montoursville; Galen Ingram, Muncy, both of Pa.

[73] Assignee: The Young Industries, Inc., Muncy, Pa.

[21] Appl. No.: 995,669

[22] Filed: Dec. 21, 1992

Related U.S. Application Data

[62] Division of Ser. No. 693,715, Apr. 30, 1991, Pat. No. 5,246,655.

[51] Int. Cl.⁶ .......................................... G01F 11/10
[52] U.S. Cl. .................................................. 222/368
[58] Field of Search ................ 222/368, 342; 137/315; 251/214, 304

[56] References Cited

U.S. PATENT DOCUMENTS

| | | | |
|---|---|---|---|
| 3,612,307 | 10/1971 | Vogt | 222/368 X |
| 3,633,797 | 1/1972 | Graff | 222/368 X |
| 4,316,559 | 2/1982 | McLemore | 222/368 X |
| 4,600,032 | 7/1986 | Heyl | 137/315 |
| 4,768,683 | 9/1988 | Gold et al. | 222/368 X |

Primary Examiner—Gregory L. Huson
Attorney, Agent, or Firm—Lalos & Keegan

[57] ABSTRACT

In a rotary valve including a housing having a rotor chamber and a drive shaft journaled in the housing and having an end portion thereof projecting into the rotor chamber, a rotor mountable on the drive shaft within the rotor chamber comprising a solitary body of plastic material having a cylindrical wall provided with a plurality of circumferentially spaced pockets machined-out therein, means for detachably mounting the body on the drive shaft and means for securing the body to the drive shaft when mounted thereon.

9 Claims, 1 Drawing Sheet

VALVE ROTOR

This is a divisional of application Ser. No. 07/693,715 filed on Apr. 30, 1991 and now U.S. Pat. No. 5,246,655.

This invention relates to rotary valves and more particularly to an improved rotor for rotary valves used to meter bulk materials such as powders, granules, pellets, chips, grains and the like. The invention further contemplates an improved method of manufacturing such rotors.

In the prior art, there has been developed a type of rotary valve which generally consists of a housing having a rotor chamber and a removable cover plate defining an end wall of the rotor chamber, a drive shaft journaled in the housing of the assembly and having an end portion projecting into the rotor chamber, and a rotor removably mounted on the drive shaft end portion whereby the rotor may be removed from the rotor chamber by removing the cover plate on the housing and sliding the rotor off of the drive shaft end portion and passing it through the opening in the housing provided by the removal of the cover plate. Such a valve assembly particularly is adapted for use where sanitary conditions are required such as in the food processing, pharmaceutical and other industries. The assembly permits the rotor to be periodically readily removed, cleaned and replaced to maintain optimum sanitary operating conditions. Such type of valve assembly is more specifically illustrated and described in U.S. Pat. Nos. 4,059,205; 4,600,032 and 4,830,043 assigned to The Young Industries, Inc. of Muncy, Pa., which are incorporated herein by reference.

Typically, the rotors of such valves are fabricated by cutting a piece of tubular metal stock of a desired diameter to a proper length, machining the tubular member to provide internal splines or other means of securing the rotor to the drive shaft of the valve, forming and welding a pair of axially spaced, annular metal shrouds on the tubular member to provide a pair of end walls, and then forming and welding a plurality of metal vanes to the inner surfaces of the shrouds and the outer surface of the tubular member to form a plurality of circumferentially spaced pockets which are adapted to receive product from an inlet of the valve housing, convey the product through the rotor chamber and discharge the product through an outlet of the valve housing. Commonly, such rotor components have been formed of mild steel, stainless steel or aluminum, and are welded together.

Rotors of the type described, however, have been found not to be suitable for all applications. In the pharmaceutical and food processing industries where product contamination must be avoided, the rotor components usually are formed of stainless steel which substantially increases the cost of the valve. Even with the use of stainless steel, however, such rotors have been found not to be entirely satisfactory in that fine and superfine materials being processed have a tendency to compact in the sharp corners and junctures of the pocket walls which necessitates more frequent removal, cleaning and replacement of the rotor, resulting in lower productivity. In the manufacture of explosive materials where detonation is a problem, it further is required to provide a rotor which will not spark and thus cause detonation. Accordingly, it has been found to be desirable to provide an improved rotor for a rotary valve which is suitable not only for the processing of ordinary materials not requiring any special handling but also materials subject to contamination and detonation which requires infrequent removal from service for cleaning or maintenance purposes.

Accordingly, the principal object of the present invention is to provide an improved rotor for a rotary valve.

Another object of the present invention is to provide an improved rotor for a rotary valve suitable for metering bulk materials such as grains, granules, pellets, chips, powders and the like.

A further object of the present invention is to provide an improved rotor for a rotary valve which may be readily removed from the valve housing, cleaned and replaced.

A still further object of the present invention is to provide an improved rotor for a rotary valve which will prevent contamination of the product being processed.

Another object of the present invention is to provide an improved rotor for a rotary valve which will prevent sparking and corresponding detonation of explosive materials being processed.

A further object of the present invention is to provide an improved rotor for a rotary valve which is suitable for use in the pharmaceutical and food processing industries and also in the manufacture of explosive materials.

A still further object of the present invention is to provide an improved rotor for a rotary valve in which compaction of fine and super fine materials being processed is avoided requiring less frequent cleaning and correspondingly resulting in higher productivity.

Another object of the present invention is to provide an improved rotor for a rotary valve which is simple in construction, comparatively easy to manufacture and highly effective in service.

A further invention of the present invention is to provide an improved method of fabricating a rotor for a rotary valve.

Other objects and advantages of the present invention will become more apparent to those persons having ordinary skill in the art to which the present invention pertains from the following description taken in conjunction with the accompanying drawings in which.

Figure 1:
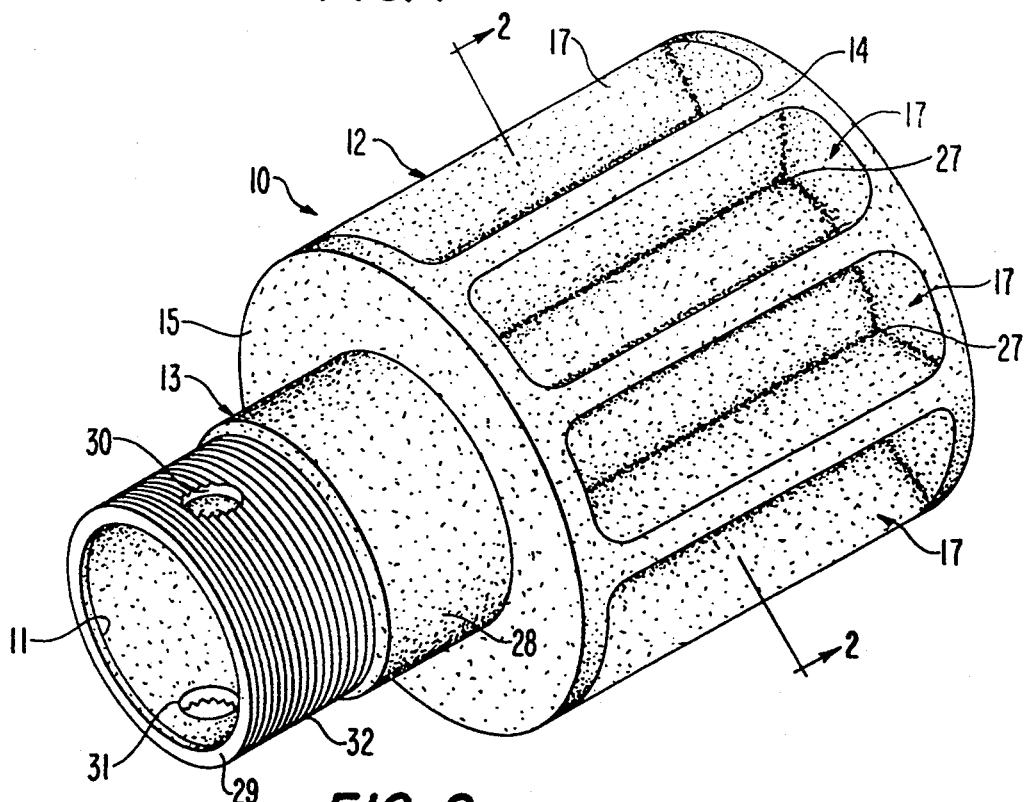
FIG. 1 is a perspective view of a rotor for a rotary valve, embodying the present invention.
Figure 2:
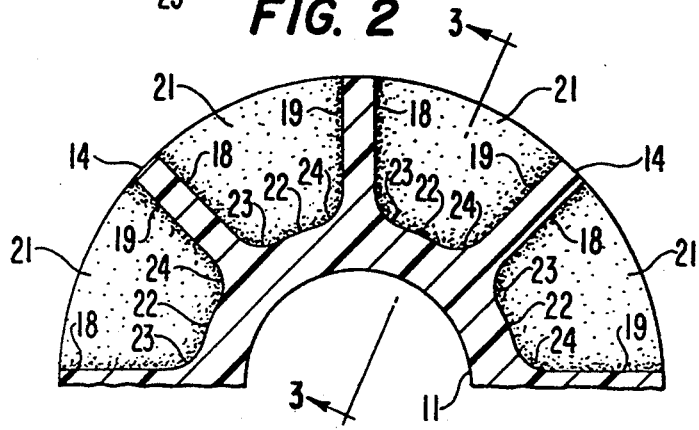
FIG. 2 is a cross-sectional view taken along line 2—2 in FIG. 1.
Figure 3:
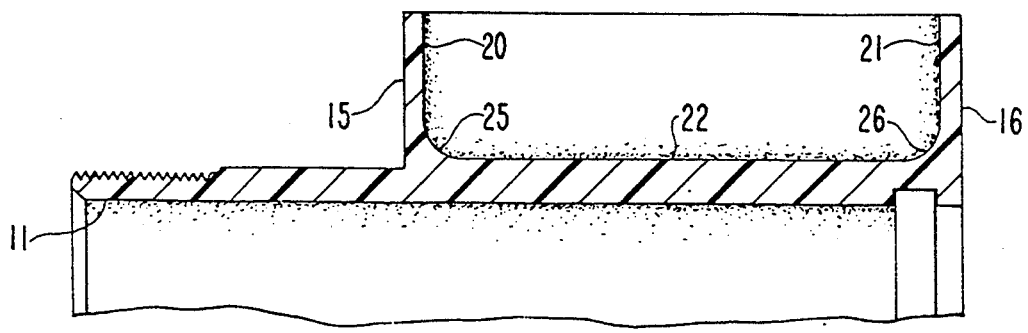
FIG. 3 is a cross-sectional view taken along line 3—3 in FIG. 2.

Referring to FIGS. 1 through 3, there is illustrated a rotor embodying the present invention which consists of a solitary body 10 formed of a thermoplastic material and having a cylindrical, shaft receiving opening 11 therethrough. The body includes a cylindrical section 12 and a reduced cylindrical section 13 which are disposed coaxially relative to opening 11. Cylindrical section 12 includes a cylindrical surface 14 and a pair of end walls 15 and 16. Formed on cylindrical wall 14 is a plurality of pockets 17 each of which is provided with a pair of converging side walls 18 and 19, a pair of end walls 20 and 21 and a bottom wall 22. As best seen in FIGS. 2 and 3, the junctures of side walls 18 and 19 with bottom wall 22 are rounded as at 23 and 24, and the junctures of end walls 20 and 21 with a bottom wall 22 are rounded as at 25 and 26. In addition, as best shown in FIG. 1, the corners formed by the side, end and bottom walls of each of the pockets also are rounded as at 27.

Reduced section 13 includes a cylindrical wall 28 and an annular end wall 29. Opening 11 is adapted to be slid onto the portion of a drive shaft of a rotary valve projecting into the rotor chamber thereof so that cylindrical section 12 with pockets 17 will be positioned within the rotor chamber in communication with the inlet and outlet ports thereof. The rotor is adapted to be drivingly connected to the drive shaft of the valve by means of a pin insertable in diametrically opposed openings 30 and 31 in reduced cylindrical section 28 which are registrable with a diametrically disposed opening in the drive shaft. It will be appreciated that by simply removing such drive pin and the cover plate at the end of the housing, the rotor may be displaced axially off of the end portion of the drive shaft and removed from the valve housing for cleaning. Correspondingly, after the rotor has been cleaned, it may readily be inserted through the access opening, slid onto the end of the drive shaft and drivingly connected thereto by registering openings 30 and 31 with the opening in the shaft and inserting the drive pin. Alternatively, the rotor may be drivingly connected to the end of the drive shaft by providing cooperating splines on the shaft and the interior wall of opening 11. The outer end of cylindrical section 28 is threaded as at 32 on which there is adapted to be threaded a collar which functions to engage and press a seal 40 against annular surface 15 of the rotor to provide a seal between the rotor and the valve housing as illustrated and described in greater detail in U.S. Pat. Nos. 4,600,032 and 4,830,043.

The rotor as described is formed by cutting off a round slug of a solid thermoplastic material to a desired length, turning the round slug on a lathe to form cylindrical sections 12 and 13, cutting threads 32 on the lathe, removing the slug from the lathe and setting it up on a vertical milling machine with a rotary table, milling each of pockets 17, milling the inside diameter of the rotor to size and then drilling holes 30 and 31 for the drive pin.

The rotor may be formed from any suitable thermoplastic material which has the characteristics of a metal, is readily machinable and is resistant to chemical attack. Preferably, the rotor is formed of an acetal copolymer material manufactured and sold by the Westlake Plastics Company of Lenni, Pennsylvania, under the trademark WESTLAKE. Such material has the characteristics of a metal, i.e., stiffness, dimensional stability, structural strength and resiliency, is lightweight and has low thermal conductivity. It is self-lubricating and wear resistant, and further resists a wide range of chemicals including salts, bases, aliphatic and aromatic hydrocarbons, halogenated hydrocarbons, alcohols, esters, ethers, ketones and most other organic and inorganic chemicals which makes it particularly suitable for pharmaceutical and foodprocessing applications. The rotor also may be formed of material manufactured by the E.I. dupont de Nemours and Company of Wilmington, Delaware and sold under the trademark DELRIN.

It further will be appreciated that the elimination of sharp junctures and corners in pockets 17 provided by rounded junctures 23 through 26 and rounded corners 27 further enhances the performance of the rotor by preventing the compaction of fine and superfine particles in such areas.

In view of the foregoing, there is provided a rotor for a rotary valve which is comparatively simple to fabricate, is highly resistant to chemical action thus minimizing if not eliminating product contamination, is non-sparking thus preventing detonation of any explosive material being processed and eliminates any sharp junctures or corners in which material being processed may compact thus requiring less frequent removal of the rotor from the valve for cleaning purposes.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. In a rotary valve including a housing having a rotor chamber and a drive shaft journaled in said housing and having an end portion thereof projecting into said rotor chamber, a rotor mountable on said drive shaft within said rotor chamber comprising:
a solitary body of plastic material having a cylindrical wall provided with a plurality of circumferentially spaced pockets machined-out therein;
means for detachably mounting said body on said drive shaft; and
means for securing said body to said drive shaft when mounted thereon.

2. A rotor according to claim 1 wherein the junctures and corners of all walls of each of said pockets are rounded.

3. A rotor according to claim 1 wherein each pocket includes a pair of side walls, a pair of end walls and a bottom wall, and the junctures and corners of said walls are rounded.

4. A rotor according to claim 3 wherein said side walls converge.

5. A rotor according to claim 1 wherein said body is formed of a material having a stiffness, dimensional stability, structural strength and resiliency comparable to a metal.

6. A rotor according to claim 1 wherein said body is formed of a material resistant to salts, bases, aliphatic and aromatic hydrocarbons, halogenated hydrocarbons, alcohols, esters, ethers and ketones.

7. A rotor according to claim 1 wherein said body is formed of a material which is self-lubricating and wear resistant.

8. A rotor according to claim 1 wherein said body is formed of a thermal plastic material.

9. A rotor according to claim 1 wherein said body is formed of an acetal copolymer.

* * * * *